Jan. 19, 1926.
A. B. MERRILL
1,570,445
METHOD OF ATTACHING RUBBER TO METAL AND ARTICLE PRODUCED THEREBY
Filed July 14, 1924
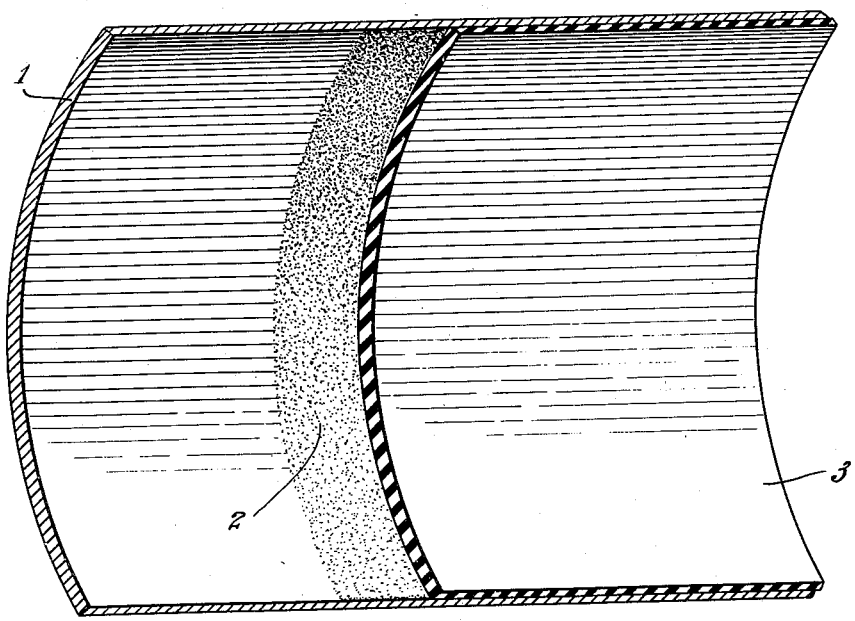
Inventor
Allan B. Merrill
By Robert M. Peerson
Atty.

Patented Jan. 19, 1926.

1,570,445

UNITED STATES PATENT OFFICE.

ALLAN B. MERRILL, OF AKRON, OHIO, ASSIGNOR TO THE B. F. GOODRICH COMPANY, OF NEW YORK, N. Y., A CORPORATION OF NEW YORK.

METHOD OF ATTACHING RUBBER TO METAL AND ARTICLE PRODUCED THEREBY.

Application filed July 14, 1924. Serial No. 725,875.

*To all whom it may concern:*

Be it known that I, ALLAN B. MERRILL, a citizen of the United States, residing at Akron, in the county of Summit and State of Ohio, have invented a certain new and useful Method of Attaching Rubber to Metal and Article Produced Thereby, of which the following is a specification.

This invention relates to the art of attaching soft rubber to metal as in lining tanks, covering rolls, etc., and its chief object is to secure an effective and durable adhesion of the rubber to the metal at a relatively small expense. My invention includes both a novel method and a novel product in this field.

Soft rubber can be made to adhere to certain metals and alloys such as copper and brass by vulcanizing it directly thereon, but it will not adhere readily to iron or steel, and hence when a union with the latter metals is desired it has been common to electroplate the iron or steel with copper or antimony and vulcanize the soft rubber on the plated surface, or alternately to apply a layer of hard rubber compound of substantial thickness upon the iron or steel base, usually with an interlocking formation which may be of various types such as dovetailed or other form of ribs and grooves, apply the soft rubber compound to the hard rubber, and vulcanize the two together upon the base. Sometimes the base is electroplated with copper preparatory to applying the hard-rubber compound. Both of these methods have their drawbacks under particular conditions, as in lining tanks or pipes where it is difficult to electroplate the interior or where the ordinary, thick hard-rubber bond would be subject to cracking by the expansion of the metal base, due to changes in temperature.

According to my present invention, I effect the bond between the soft rubber and a steel or other base by uniting the two with a layer of hard rubber so thin or film-like as to possess the necessary elasticity for resisting the cracking due to temperature changes, said bonding layer being applied in the form of cement or rubber solution of higher sulfur content.

By way of example, I have successfully lined a steel tank with an acid-resisting rubber lining in the following manner:— the inner surface of the steel tank wall is first cleaned in a suitable manner to remove any loose scale, grease or oil therefrom, and said inner surface is then painted with a cement consisting of about one-third crude rubber dissolved in gasoline, one-third quicklime and one-third sulfur, to which there is added a small percentage of a suitable hard-rubber accelerator. Two or more coats of the cement may be applied and each coat allowed to dry to a tacky condition. On this coating of hard rubber cement there is then applied in sheet form the lining consisting of crude rubber, compounded with any suitable filler such as zinc oxide and only enough sulfur to vulcanize the compound to soft rubber. Preferably, no accelerator is used in the soft-rubber compound. When the tank is completely lined, steam is turned into it at a gauge pressure of forty-five pounds to the square inch, and the rubber allowed to cure for three hours, the bonding layer of cement vulcanizing to hard, and the lining to soft rubber. Finally in order to prevent the formation of blisters from any air or vapor which may be entrapped between the rubber layers, the steam is displaced by cold air at the same pressure, and the tank is allowed to cool off for several hours, after which the compressed air is released and the lined tank is ready for use.

A suitable thickness of soft rubber for an acid-proof lining is about one-eighth of an inch, but this, of course, may be varied. The thickness of the dried hard-rubber bonding layer is on the order of one-thousandth of an inch, more or less, or in other words a mere film, and hence this layer, while effectively performing its function as a bond, will have sufficient elasticity to resist the expansion and contraction of the steel tank wall due to changes of temperature.

The accompanying drawing is a perspective view, partly broken away and in section, illustrating the above-described embodiment of my invention, 1 being the steel tank wall or shell, 2 the film-like layer of hard-rubber cement thereon, and 3 the lining layer of soft rubber.

The described procedure may be more or less varied without departing from the scope of my invention. While the invention is believed to have its most useful application in the lining of tanks where the use of other adhesion expedients is inappropriate or difficult of execution, it may also be employed in other situations such as lining pipes, ball mills, etc., and covering rolls, pavement tiles or slabs, stair treads and other objects. In the claims, the metal or other surface which is to be faced with soft rubber is referred to as the "base", but this term is intended to include cases in which the soft rubber may act as the supporting, and the metal as the supported element, and my invention also applied to situations in which the soft rubber element connects two or more metal elements.

I claim:

1. The method of uniting metal and soft rubber which comprises applying to the metal a thin bonding film of a relatively rapid-curing hard-rubber composition, superposing thereon a layer of relatively slow-curing soft-rubber composition and vulcanizing the hard-rubber and the soft-rubber together on the metal.

2. The method of uniting metal and soft rubber which comprises applying to the metal a thin bonding film of a spreadable, hard-rubber composition containing an accelerator of vulcanization, superposing thereon a layer of curable soft-rubber composition and then applying heat to vulcanize the soft and hard rubber layers together upon the metal.

3. The method of covering a base with soft rubber which comprises applying to the base a thin layer of a spreadable rubber composition containing sulfur sufficient to vulcanize the rubber to a hard-rubber film and an accelerator of vulcanization in sufficient quantities to inhibit the migration of sulfur during vulcanization, superposing thereon a layer of vulcanizable soft-rubber composition, and then applying heat to the assembled structure to vulcanize both the hard and soft rubber.

4. The method of uniting metal and soft rubber which comprises adding to a dispersion of rubber in a liquid sulfur sufficient to vulcanize the rubber to a hard-rubber composition and an accelerator of vulcanization in sufficient quantities to retard the migration of the sulfur during vulcanization, spreading the dispersion so prepared in a thin film upon the metal surface, superposing thereon a soft-rubber composition, and subjecting the assembled structure to vulcanizing temperatures.

5. A laminated structure comprising a base, a layer of vulcanized soft rubber thereon, and a layer of vulcanized hard rubber of film thickness uniting said base and soft-rubber layer, the two rubber layers having been vulcanized together on the base to secure a firm union therebetween.

6. A composite metal and rubber structure comprising a metal base, a layer of vulcanized rubber of low sulfur content thereon, and an intermediate bonding layer of vulcanized rubber of high sulfur content; said bonding layer having a thickness of the order of one thousandth of an inch, the two rubber layers having been vulcanized together on the metal to secure a firm union therebetween.

In witness whereof I have hereunto set my hand this 12th day of July, 1924.

ALLAN B. MERRILL.